US011767373B2

(12) United States Patent
Fonteyn

(10) Patent No.: US 11,767,373 B2
(45) Date of Patent: Sep. 26, 2023

(54) STABILIZED STARCH

(71) Applicant: CARGILL, INCORPORATED, Wayzata, MN (US)

(72) Inventor: Dirk Fonteyn, Bonheiden (BE)

(73) Assignee: Cargill, Incorporated, Wayzata, MN (US)

( * ) Notice: Subject to any disclaimer, the term of this patent is extended or adjusted under 35 U.S.C. 154(b) by 125 days.

(21) Appl. No.: 15/779,223

(22) PCT Filed: Nov. 16, 2016

(86) PCT No.: PCT/US2016/062235
§ 371 (c)(1),
(2) Date: May 25, 2018

(87) PCT Pub. No.: WO2017/091409
PCT Pub. Date: Jun. 1, 2017

(65) Prior Publication Data
US 2018/0355068 A1 Dec. 13, 2018

(30) Foreign Application Priority Data
Nov. 26, 2015 (EP) ..................................... 15196552

(51) Int. Cl.
*C08B 31/04* (2006.01)
*A23L 29/219* (2016.01)
(Continued)

(52) U.S. Cl.
CPC .............. *C08B 31/04* (2013.01); *A23C 9/137* (2013.01); *A23C 9/154* (2013.01); *A23C 9/1544* (2013.01); *A23C 19/054* (2013.01); *A23G 9/34* (2013.01); *A23L 29/212* (2016.08); *A23L 29/219* (2016.08); *C08B 30/12* (2013.01); *C08B 31/18* (2013.01); *C08B 31/185* (2013.01); *A23C 13/12* (2013.01); *A23C 15/12* (2013.01)

(58) Field of Classification Search
CPC ....... C08B 31/04; C08B 31/185; C08B 31/18; A23L 29/219; A23L 29/212
USPC .......................................... 426/661; 536/102
See application file for complete search history.

(56) References Cited

U.S. PATENT DOCUMENTS 1,937,543 A   12/1933  Bryant
2,108,862 A   2/1938   Ralph
(Continued)

FOREIGN PATENT DOCUMENTS

CN       1044662 A    8/1990
CN     101407552 A    4/2009
(Continued)

OTHER PUBLICATIONS

Wang, Ya-Jane et al. Carbohydrate Polymers; 52: 207-217 (2003) (Year: 2003).*
(Continued)

*Primary Examiner* — Hamid R Badr

(57) ABSTRACT

The present invention relates to a stabilized starch obtained by reacting under alkaline conditions a base starch having a protein content of less than 0.4% w/w with a reactant capable of forming active chlorine, wherein the reactant is used in an amount sufficient to provide between 4000 and 8200 ppm of active chlorine during the stabilization reaction.

20 Claims, 3 Drawing Sheets

(51) Int. Cl.
*A23L 29/212* (2016.01)
*C08B 30/12* (2006.01)
*C08B 31/18* (2006.01)
*A23C 19/05* (2006.01)
*A23G 9/34* (2006.01)
*A23C 9/137* (2006.01)
*A23C 9/154* (2006.01)
*A23C 13/12* (2006.01)
*A23C 15/12* (2006.01)

(56) References Cited

U.S. PATENT DOCUMENTS

| | | | |
|---|---|---|---|
| 2,317,752 | A | 4/1943 | Fuller |
| 2,354,838 | A | 8/1944 | Schopmeyer |
| 2,989,521 | A | 6/1961 | Senti |
| 4,281,111 | A | 7/1981 | Hunt |
| 6,235,894 | B1 * | 5/2001 | Kettlitz ............ C08B 30/12 536/102 |
| 6,749,880 | B1 | 6/2004 | Woltjes |
| 8,552,178 | B2 | 10/2013 | Berckmans |
| 2007/0039612 | A1 | 2/2007 | Veelaert |
| 2007/0224324 | A1 * | 9/2007 | Debon ............ C08B 31/04 426/550 |
| 2010/0278994 | A1 * | 11/2010 | Klemaszewski ....... A23C 9/137 426/579 |

FOREIGN PATENT DOCUMENTS

| | | |
|---|---|---|
| CN | 104781282 B | 6/2019 |
| EP | 0811633 A2 | 12/1997 |
| GB | 2506695 A | 4/2014 |
| JP | 07106377 B2 | 11/1995 |
| JP | 1053601 A | 2/1998 |
| JP | 2002521530 A | 7/2002 |
| JP | 2002534991 A | 10/2002 |
| JP | 2015532327 A | 11/2015 |
| WO | 0006607 A1 | 2/2000 |
| WO | 0044241 A1 | 8/2000 |
| WO | 2005026212 A1 | 3/2005 |
| WO | 2007071774 A1 | 6/2007 |

OTHER PUBLICATIONS

Wang, Y-J et al. Carbohydrate polymer; 52: 207-217 (Year: 2003).*
Swinkels, J. J. M. Starch/Starke. 37: 1-5 (Year: 1985).*
CN 102367280—English Abstract (Year: 2012).*
Swinkles, J J M , "Composition and Properties of Commercial Starches", vol. 37, No. 1, 1985, pp. 1-5.
Fertilizers—Nitrogen (Total) in Fertilizers, Kjeldahl Method, Rund R.C. Official Methods of Analysis of the Association of Official Analytical Chemists (1990) p. 17.
Grain and Oil Deep Processing Technology, CAO Longkui, et al. pp. 145-147, Northeast Forestry University Press, 1st edition, 70070630.

* cited by examiner

STABILIZED STARCH

CROSS REFERENCE TO RELATED APPLICATIONS

This application is a national phase application of PCT/US16/062235, filed 16 Nov. 2016, entitled STABILIZED STARCH, which claims the benefit of priority to European Application No. 15196552.2 filed 26 Nov. 2015, entitled STABILIZED STARCH, which are hereby incorporated by reference in their entirety.

FIELD OF THE INVENTION

The present invention relates to stabilized starches, in particular heat stable high viscosity starches. The starches of the present invention are obtained by reacting a starch with activated chlorine under alkaline conditions. The starches of the present invention may be used to replace conventional chemical cross-bonded starches.

BACKGROUND OF THE INVENTION

When native starch granules are dispersed or suspended in water and heated, the granules hydrate and swell during the heating. The starch dispersion or suspension typically shows a peak viscosity at temperatures between 65 and 95° C. The increased viscosity is a desirable characteristic in many food applications. The swollen granules are however very fragile and tend to disintegrate which leads to a decrease in viscosity, which is typically referred in the art as viscosity breakdown. Shear and/or extreme pH conditions tend to speed up this disintegration process and may lead to an earlier onset of viscosity breakdown and/or a stronger decrease in viscosity.

High viscosity starches are starches which show an increase in viscosity upon heating. Examples of starches with a high swelling power include those derived from waxy varieties, tubers and roots (e.g. potato, tapioca). However, the swollen high viscosity starches still burst to a large extent during heating which leads again to a drastic viscosity breakdown.

In order to overcome the undesirable viscosity breakdown starches may be stabilized, e.g. by treating the starch with chemical reagents. These reagents introduce intermolecular bridges or cross-links between the starch molecules or in other words the starch is cross-linked or cross-bonded. Stabilized starches and in particular stabilized high viscosity starches may show substantial swelling upon heating while essentially maintaining their granular appearance upon prolonged heating. The integrity of the highly swollen starch granules in the heat stage guarantees a stable viscosity and in particular a stable paste viscosity. Such starches may also show increased stability under shear and extreme, e.g. acidic, pH conditions.

Typically cross-bonding of starch is performed with reagents such as phosphorus oxychloride, sodium trimetaphosphate, adipic anhydride, epichlorohydrin etc. In order to stabilize the starch typically very low amounts of reagent are applied. The characteristics of the final product are very much dependent on the reaction conditions which have been applied. Small deviations in the dosed amount of reagent and slight changes in reaction time may give rise to modified starches with an unpredictable viscosity behavior.

Stabilized starches are used in many different applications, for example in the preparation of soups, sauces, meat products, dressings, microwaveable food and in the preparation of bakery creams and fillings. Convenience foods need to have a high viscosity and smooth texture after heating (to 80-100° C.). Stabilized high viscosity starches are particularly suitable for the mentioned applications. The field of applications further includes instant thickening food preparations in which stabilized starches are typically used in a pre-gelatinized form obtained by e.g. by roll-drying. Chemical modification of starches is a well-known process the process has been described in several patents.

JP-B-07106377 (Japan Maize Products) describes the oxidation of starch. During its oxidation, the starch is de-polymerized.

U.S. Pat. No. 1,937,543 describes a method of making an oxidized starch. It discloses that an undesirable excess of sulfur dioxide may be removed by the addition of a determined amount of sodium hypochlorite sufficient to oxidize the sulfur dioxide. However, the slight excess of the hypochlorite may detrimentally affect the taste of the finished product.

U.S. Pat. No. 2,108,862 describes a process of making halogenated thick boiling starches. The reaction is performed under acidic pH.

U.S. Pat. No. 2,317,752 describes a method of producing what the inventors call an 'inhibited' starch, i.e. starch differing from raw starch in that it yields upon cooking in aqueous media a 'short' smooth and stable paste. It is reported that it is known that the reaction of starch with hypochlorite gives thin-boiling starches. Inhibited starches according to this patent are obtained when hypochlorite is used in combination with a considerable amount of a reaction modifier.

U.S. Pat. No. 2,354,838 describes a method for thinning waxy maize starch by hypochlorite treatment. According to this patent, the obtained products are low viscosity starches with clarity, adhesive strength and no retrogradation tendency.

U.S. Pat. No. 2,989,521 describes a method of cross-linking and oxidizing a starch. The starting material for the hypochlorite treatment is extremely highly cross-bonded starch obtained with epichlorohydrin and with no measurable viscosity. This starch is then treated with high amounts of hypochlorite in order to weaken the structure and increase the viscosity. The diglycerol ether bonds are not broken during the alkaline hypochlorite treatment. By this treatment a large number of carboxyl groups (3-9 mol/100 AGU) are introduced. Due to these hydrophylic groups the starch can swell in water and develops a high viscosity.

U.S. Pat. No. 4,281,111 describes a hypochlorite treatment of starch at pH of around 3 followed by a hydroxypropylation.

EP patent 0 811 633 discloses heat stable high viscosity starches which were obtained by reacting a high viscosity starch with activated chlorine under alkaline conditions.

GB 2506695, WO 2005/026212; WO 2007/071774; WO 2000/44241; and WO 2000/06607 disclose various processes of treating starches with active chlorine in order to achieve various degrees of stabilization, wherein the used levels of active chlorine are above 12.000 ppm and even above 20.000 ppm. Such reactions where high levels of active chlorine are used, e.g. above 10.000 ppm, are generally referred to as oxidation reactions. Although providing reasonable stabilization, the use of such high levels of active chlorine may however deleteriously affect other properties of the starches, e.g. organoleptic profile, mouthfeel, texturizing power, etc. The technologies disclosed in these publications may thus fail to provide a starch having an optimum balance of properties, e.g. both in rheological terms as in organoleptic profiles.

The inventors also observed that, depending on the applied oxidation conditions, the known starches may be hydrolyzed during the oxidation reaction, which in turn may lead to a reduced resistance to retrogradation. Starch retrogradation is a process which occurs when the molecules comprising gelatinized starch begin to re-associate in an ordered structure. In initial phases, two or more starch chains may form a simple juncture point which then may develop into more extensively ordered regions. Ultimately, under favorable conditions a crystalline order is developed in the starch, process which was called retrogradation (see Atwell et al. 1988).

Extensive chemical modifications, e.g. cross-linking, of starches are also not allowed when starches are used in the manufacturing of food products. There is therefore a need for a starch which can be used as an ingredient in food products, i.e. a starch which is mildly chemically modified; and which possesses the characteristics of a heat stable high viscosity starch. In particular there is a need for a starch which can be used as an ingredient in food products and which maintains an optimum viscosity under shear and/or extreme temperature and/or pH conditions. More in particular there is a need for a starch which can be used as an ingredient in food products, which has reduced or non-existent retrogradation and which maintains its granular structure under shear and/or severe temperature and/or pH conditions. There is also a need for food products containing such starches and having excellent organoleptic properties.

SUMMARY OF THE INVENTION

According to the present invention, there is provided a stabilized starch obtained by reacting under alkaline conditions a base starch having a protein content of less than 0.4% w/w with a reactant capable of forming active chlorine, wherein the reactant is used in an amount sufficient to provide between 4000 ppm and 8200 ppm of active chlorine during the stabilization reaction.

The present inventors observed that the starch of the invention is optimally stabilized at least against heat, i.e. the starch shows no, or essentially no, viscosity breakdown during heating. Moreover, said starch shows an excellent viscosifying power. The starch of the invention will be hereinafter referred to for simplicity as the inventive starch.

It is known that hydrogen bonds are responsible for the integrity of starch granules. When aqueous suspensions of starches are heated, sheared and/or acidified, the hydrogen bonds weaken; the starches swell and eventually fragment, rupture and collapse. When this happens, a significant drop in the viscosity typically occurs, i.e. viscosity breakdown. The inventive starch however is stabilized with chemical bonds which act as bridges between starch molecules. When the inventive starch is heated e.g. in water, the hydrogen bonds may be weakened or destroyed but said starch is kept essentially intact to varying degrees by the chemical bonds. The optimum degree of stabilization of the inventive starch but also an optimum distribution of said chemical bonds between starch molecules may provide an optimum resistance to viscosity breakdown and loss of texture when a specific set of conditions in terms of heat, acid or shear are applied on said starch. Without being bound to any theory, the present inventors believe that the inventive starches have an optimum degree of stabilization and an optimum distribution of chemical bonds to ensure for an optimum stability of the starch under severe processing conditions of at least temperature, but also acidity and/or mechanical shear. In contrast with the inventive starch, the known starches typically have an insufficient stabilization degree but also an ineffective distribution of chemical bonds and they may thus suffer from disintegration, viscosity breakdown and texture loss, especially under extreme processing conditions.

The present inventors succeeded in providing the inventive starch with an optimum amount of chemical bonds and distribution thereof as evidenced by the superior viscosifying and/or texturizing power of the starch. Such benefits, may translate into an optimum thickening power and textural properties achievable in particular under severe conditions of heat, acidity and/or shear.

DETAILED DESCRIPTION OF THE INVENTION

Figure 1A:
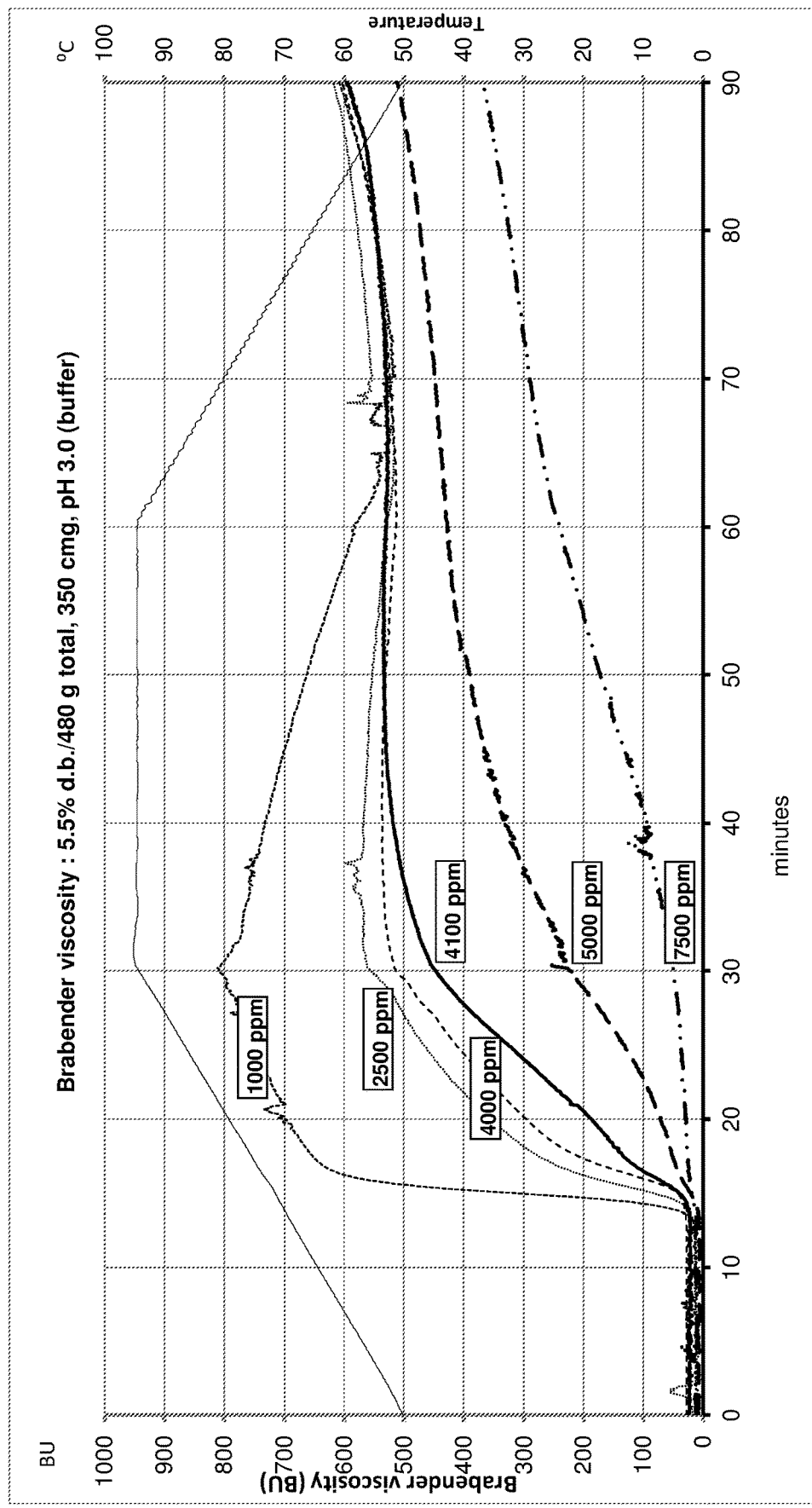
FIG. 1: Brabender viscograms (26.4 g d.b. starch slurrified in buffer at pH of 3.0 for a total weight of 480 g slurry) of waxy maize starch (C*Gel 04201) treated first with 3 wt % n-octenyl succinic anhydride and then with different levels of active chlorine (added in the form of NaOCl) at pH 8.5 for about 1 hour.
Figure 1B:
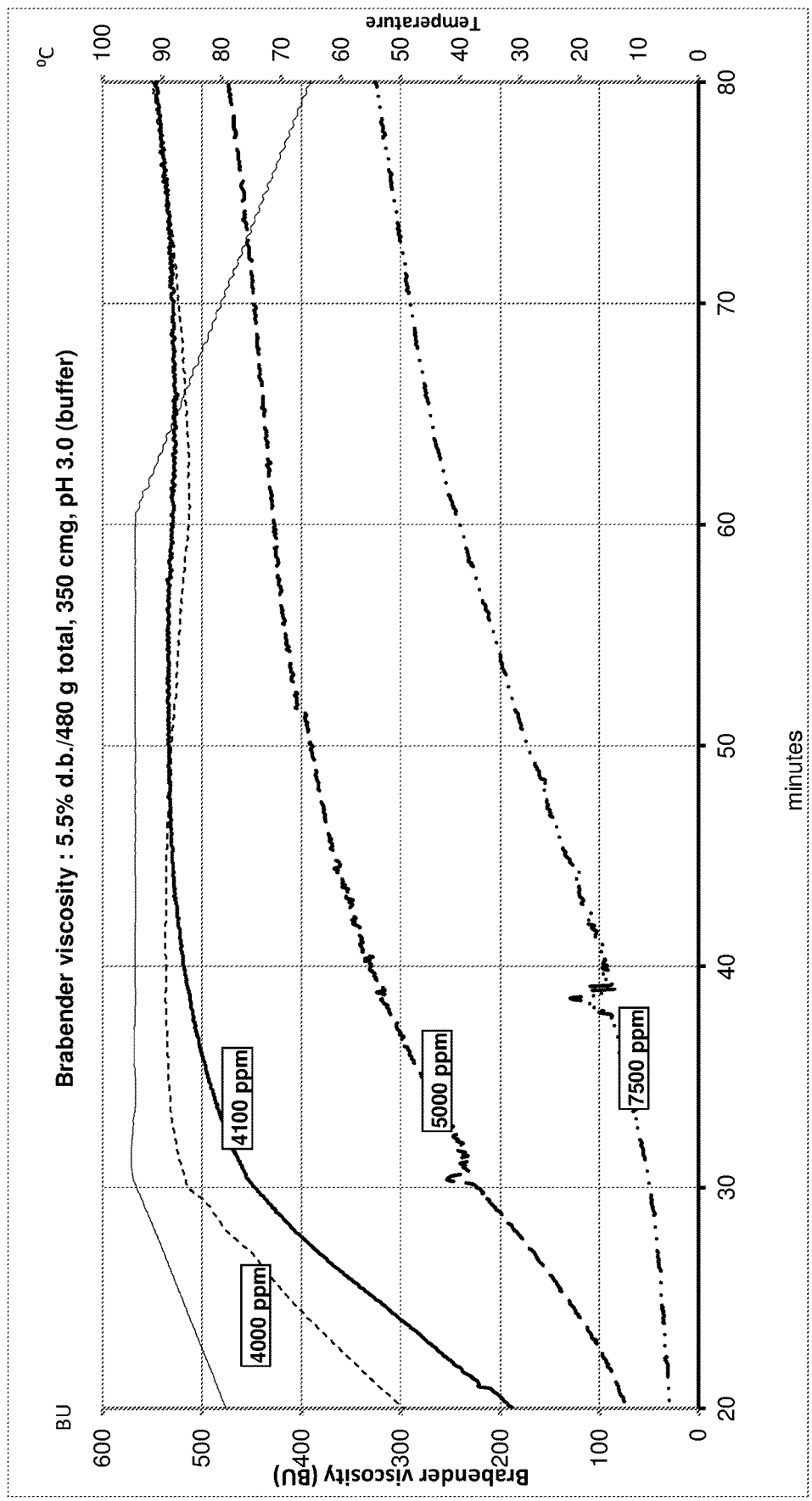

The present invention provides a stabilized starch, i.e. a starch which is able to provide an optimum viscosity and/or texture to a food product when processed under mild but also under severe conditions of shear, acidity and/or temperature. In particular, the inventive starch is a heat stable high viscosity starch prepared without the use of conventional cross-bonding reagents. The inventive starch is obtained by reacting under alkaline conditions a base starch having a protein content of less than 0.4% w/w with a reactant capable of forming active chlorine. According to the invention, it is essential that the reactant is used in an amount sufficient to provide between 4000 ppm and 8200 ppm of active chlorine during the stabilization reaction.

The inventive starches are starches which due to the treatment with active chlorine have been modified in such a way that they retain a high viscosity even upon prolonged heating. Said inventive starches also retain high viscosity when heated under alkaline or acidic conditions. Furthermore the high viscosity is also retained after repeated heating and cooling.

The inventive starches show only an increase in viscosity under acidic conditions during the heating phase at 95° C. of the measurement with the Brabender viscograph, preferably the increase in viscosity is at least 10%, more preferably at least 15%. Preferably, said starches show said increase at a pH below 5.5, more preferably below 4.0, most preferably below 3.0. Preferably said pH is 3.0. Preferably, said starch is characterized by a positive viscosity ramp (VR), wherein VR=$\Delta$Viscosity/$\Delta$time (BU/sec). Preferably, said VR is at most 0.20 BU/sec, more preferably at most 0.18 BU/sec, most preferably at most 0.16 BU/sec. The inventors observed that such a starch has a more predictable rheological behavior which in turn may help food designers to better tune the properties of final products containing thereof.

The base starch used in the stabilization reaction is a native starch or a modified starch. The term starch as used herein includes starches, but also ingredients containing starches. Ingredients containing starches include without limitation, flours and grits. The term base starch is herein understood as the starch subjected to the stabilization reaction.

A native starch is a starch derived from any native source, i.e. a source which is found in nature. Also suitable are starches derived from a plant obtained by standard breeding techniques including crossbreeding, translocation, inversion, transformation, insertion, irradiation, chemical or other induced mutation, or any other method of gene or chromosome engineering to include variations thereof. In addition, starch derived from a plant grown from induced mutations and variations of the above generic composition which may be produced by known standard methods of mutation breeding are also suitable herein.

A modified starch has a structure that has been altered from its native state, resulting in modification of one or more of its chemical or physical properties. Modified starches include without limitation oligosaccharides and other modified starch including those prepared by physically, enzymatically or chemically modifying the starch. Such materials are known in the art and may be found in standard texts such as Modified Starches: Properties and Uses, Ed. Wurzburg, CRC Press, Inc., Florida (1986).

Typical sources for the starches are cereals, tubers and roots, legumes and fruits. The native source can be any variety, including without limitation, corn, potato, sweet potato, barley, wheat, rice, sago, amaranth, tapioca (cassava), arrowroot, canna, pea, banana, oat, rye, triticale, and sorghum, as well as low amylose (waxy) and high amylose varieties thereof. Cereal starches (maize, wheat, sorghum) or leguminous starches (smooth pea, fava bean) and high amylose starches show reduced viscosity breakdown when heated at neutral pH under atmospheric conditions. Nevertheless these starches may further be stabilized by the stabilization reaction in accordance to the present invention.

The inventors observed that low amylose or waxy starch varieties perform extremely well when stabilized in accordance with the invention. A low amylose or waxy starch is intended to mean a starch containing less than 30% amylose by weight of said starch, preferably less than 20%, more preferably less than 10%, even more preferably less than 5%, yet even more preferably less than 2% and most preferably less than 1% amylose by weight of the starch. In contrast to low amylose starches, high amylose starches are those which contains more than 30% amylose and even more than 50% amylose.

The base starch used in the stabilization reaction has a protein content of less than 0.40% w/w, more preferably at most 0.35% w/w, most preferably at most 0.30% w/w. Preferably, said base starch has a protein content of at least 0.01% w/w, more preferably at least 0.03% w/w, most preferably at least 0.05% w/w. The inventors observed that such low protein content starches can be optimally stabilized to provide superior viscosifying properties and/or textures even when processed under severe processing conditions. Advantageous results were obtained when said starch had a protein content of between 0.01% and 0.39% w/w, more preferably between 0.10% and 0.38% w/w, even more preferably between 0.20% and 0.35% w/w, most preferably between 0.25% and 0.30% w/w.

Most preferably, the base starch used in the stabilization reaction is selected from the group consisting of waxy, root and tuber starches but also combinations thereof. Waxy starches and root or tuber starches normally suffer from a pronounced viscosity breakdown during prolonged heating. Therefore the stabilization effect due to the treatment of the present invention is most beneficial in these cases. Waxy starches preferably include waxy maize, waxy rice, waxy potato, waxy sorghum and waxy barley. Favorable results were obtained when the waxy starch were double mutant starches, e.g. dull waxy (duwx) and waxy shrunken-1 (wxshr-1). Moreover, it was observed that the stabilized double mutant starches showed an increased acid stability. This effect was most pronounced with the duwx starch.

In a preferred embodiment, the base starch used in the stabilization reaction is a waxy starch selected from the group consisting of waxy maize, waxy rice, waxy potato, waxy sorghum, waxy barley and any combination thereof, said waxy starch being also modified. Preferably, the waxy starch is a double mutant starch, e.g. dull waxy (duwx) or waxy shrunken-1 (wxshr-1). Preferably, said starch is modified by a chemical reaction with a succinic anhydride (hereinafter SA starch), more preferably with an n-alkenyl succinic anhydride (hereinafter nASA starch), most preferably with n-octenyl succinic anhydride (hereinafter nOSA starch).

The present invention also relates to a method for stabilizing starches comprising the steps of:
a) Providing a base starch having a protein content of less than 0.4% w/w; and
b) Reacting said base starch with a reactant capable of forming active chlorine, said reactant being present in an amount sufficient to provide between 4000 ppm and 8200 ppm of active chlorine during the stabilization reaction.

As mentioned above, the base starch is a native starch or a modified starch. In case the base starch is modified, such starch may be modified before or after the stabilization reaction.

The stabilization reaction is preferably carried out on native starches, however the combination with chemical substitutions such as acetylation, hydroxypropylation or n-octenylsuccinylation is not excluded. When the reaction is carried out in combination with a chemical modification such as acetylation, hydroxypropylation or n-octenylsuccinylation, the treatment with chlorine can occur before, during or after the chemical modification reaction. The treatment with active chlorine during or after, most preferably after, the chemical modification are preferred because of a more pronounced stabilization effect with the same treatment level of chlorine.

The base starch during the reaction with the reactant at step b) of the method of the invention (hereinafter "the inventive method") is preferably in a form of an aqueous solution (slurry) of said starch. The starch content of the aqueous slurry is not critical, but may be in the range of from 1 wt % (dry starch basis) to 90 wt %, more preferably from 5 wt % to 80 wt %, most preferably from 10 wt % to 70 wt %.

According to an advantageous embodiment of the present invention, the method comprises treating the starch with a protease to lower the amount of protein to the levels required by the invention. The protease treatment is carried out before the treatment with active chlorine. It has been found that such a protease treatment not only optimizes the stabilization of the starch but also it may improve the mouthfeel, texturizing power and/or organoleptic properties thereof. In case the base starch has a protein content of below 0.4 wt %, the protease treatment may be carried out lower even further said content to values of below 0.2 wt % and even below 0.1 wt %.

When a protease treatment is included, it is essential that it is carried out before the treatment with the active chlorine.

Usually it will be expedient to carry out the protease treatment on a slurry of the starch preferably followed by a washing step, e.g. with water. The starch content of the aqueous slurry to be used for the protease treatment may be the same as described above. The enzyme for use in the protease treatment is preferably a food grade protease. An example thereof is Alcalase® from Novozymes A/S. Other suitable proteases known to those skilled in the art can be used.

If present, the protease treatment step is preferably carried out at a temperature of from 25° C. to about 55° C., more preferably from 35° C. to about 45° C. The pH of the aqueous starch slurry is preferably adjusted to about 8 prior to the addition of protease and is maintained at that level during the protease treatment. The adjustment and maintenance of the pH may be achieved by addition of a suitable alkali. AN aqueous solution of an alkali metal hydroxide such as sodium hydroxide may be used. The treatment with a protease is preferably carried out for a period of time from 30 minutes to around 1.5 hours. Following the protease treatment, the slurry temperature is preferably lowered for example below 45° C., more preferably 40° C., even more preferably below 35° C., most preferably below 30° C. and the pH is lowered below 8 to deactivated the protease. AN appropriate pH for the deactivation is at most 7, more preferably at most 5, most preferably at most 3.

The protease-treated starch may be recovered by filtering the slurry to obtain a starch cake which may be washed e.g. with water, and optionally dried and/or re-slurried in preparation for the treatment with active chlorine.

In a preferred embodiment of the invention, the method for stabilizing starches comprises in the following sequence, the steps of:
a) Providing a protein containing native starch, preferably a native starch selected from the group of root, tubers and/or waxy starches, more preferably a native waxy starch;
b) Treating said starch with a protease to lower the content of said protein to less than 0.4% w/w, more preferably to at most 0.35% w/w, most preferably to at most 0.30% w/w;
c) Physically, chemically or enzymatically modifying said starch to obtain a modified starch; and
d) Reacting said modified starch with a reactant capable of forming active chlorine, said reactant being present in an amount sufficient to provide between 4000 ppm and 8200 ppm of active chlorine during the stabilization reaction.

In a further preferred embodiment of the invention, the method for stabilizing starches comprises in the following sequence, the steps of:
a) Providing a native starch, preferably a native starch selected from the group of root, tubers and/or waxy starches, more preferably a native waxy starch, having a protein content of less than 0.4% w/w;
b) Physically, chemically or enzymatically modifying said starch to obtain a modified starch; and
c) Reacting said modified starch with a reactant capable of forming active chlorine, said reactant being present in an amount sufficient to provide between 4000 ppm and 8200 ppm of active chlorine during the stabilization reaction.

In a further preferred embodiment of the invention, the method for stabilizing starches comprises in the following sequence, the steps of:
a) Providing a native starch, preferably a native starch selected from the group of root, tubers and/or waxy starches, more preferably a native waxy starch, having a protein content of less than 0.4% w/w;
b) Reacting said native starch with a succinic anhydride, more preferably with n-alkenyl succinic anhydride, most preferably with n-octenyl succinic anhydride to obtained a modified starch; and
c) Reacting said modified starch with a reactant capable of forming active chlorine, said reactant being present in an amount sufficient to provide between 4000 ppm and 8200 ppm of active chlorine during the stabilization reaction.

In a further preferred embodiment of the invention, the method for stabilizing starches comprises in the following sequence, the steps of:
a) Providing a native starch, preferably a native starch selected from the group of root, tubers and/or waxy starches, more preferably a native waxy starch, having a protein content of less than 0.4% w/w;
b) Reacting said native starch with n-octenyl succinic anhydride to obtained a nOSA starch; and
c) Reacting said nOSA starch with a reactant capable of forming active chlorine, said reactant being present in an amount sufficient to provide between 4000 ppm and 8200 ppm of active chlorine during the stabilization reaction.

In the most preferred embodiment of the invention, the method for stabilizing starches comprises in the following sequence, the steps of:
d) Providing a protein containing native starch, preferably a native starch selected from the group of root, tubers and/or waxy starches, more preferably a native waxy starch;
e) Treating said starch with a protease to lower the content of said protein to less than 0.4% w/w, more preferably to at most 0.35% w/w, most preferably to at most 0.30% w/w;
f) Reacting said native starch with n-octenyl succinic anhydride to obtained a nOSA starch; and
g) Reacting said nOSA starch with a reactant capable of forming active chlorine, said reactant being present in an amount sufficient to provide between 4000 ppm and 8200 ppm of active chlorine during the stabilization reaction.

In accordance with the method of the invention (hereinafter referred to as the inventive method), the base starch is reacted with a reactant capable of forming active chlorine during the stabilization reaction. Non-limiting examples of reactants include hypochlorite, peracetic acid, hydrogen peroxide in the presence of excess chloride ions and combinations thereof.

Preferably, the reactant is hypochlorite, examples thereof including sodium hypochlorite and calcium hypochlorite. The hypochlorite may be in the form of a sodium or calcium salt.

The reactant used in accordance with the invention is capable of forming active chlorine and is used in an amount sufficient to provide between 4000 ppm and 8200 ppm active chlorine during the stabilization reaction. Preferably, said amount of reactant is sufficient to provide at least 4100 ppm active chlorine, more preferably at least 4200 ppm, even more preferably at least 4300 ppm, yet even more preferably at least 4400 ppm, most preferably at least 4500 ppm active chlorine during the stabilization reaction, provided that said amount does not exceed 8200 ppm. Preferably, said amount of reactant is sufficient to provide at most 8000 ppm active chlorine, more preferably at most 7800 ppm, most preferable at most 7500 ppm. Preferably, said amount of reactant is sufficient to provide between 4010 and 8200 ppm active chlorine, more preferably between 4050 and 7500 ppm, more preferably between 4100 and 7000 ppm, more preferably between 4100 and 6000 ppm, more preferably between 4200 and 5500 ppm, most preferably between 4300 and 5000 ppm active chlorine. The inventors observed that by using these amounts of active chlorine in the stabilization reaction, the inventive starches were optimally stabilized. Moreover, said starches may be able to maintain their granular shape during processing while also providing excellent viscosifying and/or texturizing power.

In a preferred embodiment, the amount of reactant is sufficient to provide between 4010 and 6000 ppm active chlorine, more preferably between 4050 and 5750 ppm, more preferably between 4100 and 5500 ppm, more preferably between 4150 and 5250 ppm, more preferably between 4200 and 5000 ppm, most preferably between 4300 and 4800 ppm active chlorine. When such amounts of reactant are used, the method of the invention is preferably free of a protease treatment step.

The stabilization reaction may be carried out at any desired pH. However, when the base starch is a modified starch, more preferably a SA starch, even more preferably a nASA starch, most preferably a nOSA starch, the stabilization reaction is carried out at a pH of between 5.0 and 11.5, more preferably between 7.0 and 10.5, most preferably between 8.0 and 9.0. Preferably, the base starch is a nOSA starch and the stabilization reaction is carried out at a pH of between 5.0 and 11.5, more preferably between 7.0 and 10.5, most preferably between 8.0 and 9.0.

In general the conditions during the stabilization reaction (active chlorine amount, time, temperature, pH) should be controlled in such a way that no starch degradation and no substantial formation of carboxyl groups (i.e. less than 0.1%) occur. Typical reaction times and temperatures are between 0.25 to 5 hours and between 10 and 55° C., respectively.

An advantage of the inventive method is the bleaching effect of the stabilization reaction which leads to a colorless product. In addition, micro-organisms are eliminated improving the sterility of the inventive starch.

The inventive starches may be used in any application and in particular in those applications where thick boiling starches are needed. Non-limiting examples of applications include thickeners for soups and sauces, beverages, stabilizers for meat products, in dressings, spreads, convenience food and the like. The inventors observed that the inventive starches influence positively the freshness of food products, in particular of bakery products. Pre-gelled inventive starches (instant starches) are especially suited for the stabilization of bakery products including fillings and creams.

The inventors surprisingly observed that food products can be manufactured by using the inventive starches to achieve the desired properties, e.g. texture and/or organoleptics, without the need of using any differently modified or stabilized starch. Said starch maintains its granular structure under shear and/or severe temperature and/or pH conditions. The invention therefore relates to a food product comprising a granular starch and additional food ingredients, said granular starch having a protein content of less than 0.4% w/w, said granular starch being stabilized by reacting it with active chlorine and preferably modified by reacting it with a succinic anhydride, more preferably with a n-alkenyl succinic anhydride, most preferably with n-octenyl succinic anhydride. Preferably, said food product is a dairy product, more preferably a yoghurt.

In a preferred embodiment, the invention relates to a food product comprising the inventive starch and additional food ingredients, wherein said food product is free of any other modified starch different than the inventive starch. Preferred embodiments of the inventive starch are given hereinabove and will not be repeated herein.

The inventors also surprisingly observed that the inventive starch provides dairy products containing thereof with excellent properties. The invention therefore relates to a dairy product comprising the inventive starch. Preferably, said dairy product is free of any other modified starch different than the inventive starch. Preferably said dairy products contain the inventive stabilized SA starch, more preferably the inventive stabilized nOSA starch.

By dairy product is herein understood milk or any food product prepared from milk (e.g., cow milk, goat milk, and soy milk), including butter, cheese, ice cream, pudding, sour cream, yogurt (e.g., spoonable, drinkable, and frozen), and dried and condensed milk. Products manufactured with soy milk and soy-based products also can be used in the examples described herein. Any method known to the skilled person can be used to prepare dairy products containing the inventive starch.

The inventive starch can be used to substitute some or all of the fat in the dairy product, for example, between 5% and 100% of said fat can be replaced or substituted with the inventive starch. Preferably said starch is used to substitute between 20 and 100% of the fat, more preferably between 30 and 70%, most preferably between 40 and 60% of the fat in a typical dairy product is substituted with the inventive starch.

The inventive starch can also be used to substitute some or all of the lipids in the dairy product. In particular in pourable dairy products, the upper limit for the inventive starch added to the dairy product is preferably about 10 wt % relative to the weight of said product, as higher levels may result in difficulty with processing the dairy products due to high viscosity. For pourable dairy products, the inventive starch is more preferably added in an amount of up to 5 wt %, most preferably of up to 1 wt %. Preferably, in said pourable dairy products, the amount of inventive starch is between 0.01 and 10 wt %, more preferably between 0.5 and 7.5 wt %, most preferably between 0.6 and 5 wt %. In solid dairy products, such as nonfat processed cheese, the inventive starch may be added to levels exceeding 25 wt %.

In one embodiment of the invention, the inventive starch is used as a viscosifying agent in the dairy product, i.e. said starch is used to increase the viscosity of the dairy product. The inventive starch can be used to increase viscosity in place of other viscosifying starches, hence no such additional starches may be needed.

Dairy products may further contain nonfat milk solids, milkfat, water, and any other additional ingredients and/or additives commonly used in such products including but not limited to bacterial cultures, flavorings, sweeteners, gelatin, gums, and starches, among others. Nonfat dairy products typically contain little to no milkfat, e.g., less than 0.5 gram milkfat per serving. A "nonfat" sour cream may contain up to 1.5% fat. Whole milk, low-fat milk, or nonfat animal milks, as well as soy milk, may be used to make dairy products.

In one preferred embodiment, the dairy product is a spoonable yoghurt wherein the inventive starch is used in a concentration of up to 5 wt %, preferably between 0.01 and 5 wt %, more preferably between 0.5 and 5 wt %, most preferably between 0.5 and 1.5 wt % relative to the weight of the yoghurt. The resulting yogurt may have a creamier and smoother texture. The creaminess is similar to that obtained by adding more fat to the yogurt, but for example without a substantial increase in calories. The resulting yogurt may also be smoother with fewer apparent curds and a more pudding-like texture.

In another embodiment, reduced-fat yogurts are prepared wherein blends of starch that include the inventive starch are used in place of some of the milkfat found in full-fat versions of yogurt. For example, the inventive starch can be used to reduce the caloric content of the yogurt by up to about 50%, such as by at least 5%, at least 10%, at least 20%, for example by about 5-20%, 10-50%, or 30-40%. The inventive starch is preferably used to increase the viscosity of the yogurt with at least 5%, more preferably at least 10%, even more preferably at least 20%, most preferably at most 50% when compared with the same yoghurt however free of any viscosifying starches. Preferably, said inventive starch is used in an amount sufficient to increase the viscosity of the yoghurt with between 5 and 20%, more preferably with between 10 and 50%, most preferably with between 30 and 40% when compared with the same yoghurt free of any viscosifying starches. The inventive starch may also enhance the mouthfeel of the yogurt, i.e. produce a smoother texture and increased creaminess.

The invention also relates to a reduced-fat yogurt formulated such that the inventive starch substitutes for up to 100% of the milkfat, preferably at least 20% of the milkfat, more preferably between about 40% and 50% of the milkfat. The use of inventive starch may reduce the caloric content of said yogurt, increase its viscosity, enhance its mouthfeel and texture, or combinations thereof. Preferably, the inventive starch is chosen from the group consisting of nOSA-modified waxy maize starch, nOSA-modified tapioca starch, nOSA-modified corn starch and nOSA-modified potato starch. Preferably, the reduced-fat yogurts have a fat content of at most 2 wt %.

The invention also relates to a yogurt containing a blend of starches, wherein said blend contains the inventive starch. Preferably, said inventive starch chosen from the group consisting of nOSA-modified waxy maize starch, nOSA-modified tapioca starch, nOSA-modified corn starch and nOSA-modified potato starch. Nonfat and reduced-fat yogurts may be formulated in which the usual compositions of nonfat and reduced-fat yogurt are altered only by the addition of the inventive starch. The inventive starch can be added to increase the viscosity of the yogurt and to enhance its mouthfeel and texture. Preferably, the yogurt contains at most 5 wt % inventive starch based on the total weight of the yoghurt, more preferably between 0.5 wt % and 3 wt % of the inventive starch.

The invention also relates to a yoghurt containing between 0.5 wt % and 3 wt % of the inventive starch based on the total weight of the yoghurt. In addition, said yoghurt also contains between 0.5 wt % and 2 wt % of a modified waxy maize viscosifying starch and/or between 0.5 wt % and 2 wt % of an unmodified viscosifying tapioca starch. The inventors also observed that smooth and creamy yogurts may be prepared by using between 0.5 wt % and 3 wt % of inventive starch combined with an additional viscosifying starch selected from modified waxy maize starch, modified dent corn, and modified tapioca starch. It was found that yogurts (e.g., spoonable yogurts) containing the above starch blend may show a significant flavor improvement.

The invention also relates to a yogurt dip containing at most 20 wt % fat, more preferably at most 10 wt % fat and further containing the inventive starch.

The invention also relates to a light sour cream containing the inventive starch. Preferably said starch is utilized to substitute for some of the fat content in the sour cream. Reduced-fat sour creams can be formulated with the inventive starch in which the final fat content is preferably between 9 wt % and 18 wt % relative to the total weight of said cream. These reduced-fat sour creams may show improved qualities of a smoother and creamier texture with a viscosity similar to that of reduced-fat sour creams made with other viscosifying starches. Preferably, the inventive starch is added to full-fat, reduced-fat, or nonfat sour cream at a concentration of at most 10 wt %, more preferably between 0.01 wt % and 10 wt %, most preferably between 0.01 wt % and 5 wt %.

The invention also relates to a cheese sauce containing the inventive starch. During thermal processing and after cooling, the cheese sauce prepared with the inventive starch may show a significantly lower viscosity than a control cheese sauce containing no or other viscosifying starches. Due to the reduced viscosity, the cheese sauce prepared with the inventive starch may show reduced fouling, e.g. deposits which build up on the inner walls of the apparatus during manufacture and result in a burned or commercially unacceptable taste, and easier filling of the manufacturing apparatus. Preferably, said cheese sauce contains at most 20 wt % inventive starch, more preferably at most 10 wt % relative to the total weight of said sauce. Preferably the amount of inventive starch in said sauce is between 0.01 wt % and 10 wt %, more preferably between 0.01 wt % and 5 wt %.

The invention also relates to a product selected from the group consisting of a frozen dessert, butter, cheese, cream, ice cream, sour cream, yogurt, pudding, dried milk and condensed milk, wherein said product contains the inventive starch. Said products may be full fat, reduced fat or non-fat products.

Methods of Measurement

Amount of active chlorine: is determined by titration. For example in a sodium hypolchlorite solution, the amount of active chlorine can be determined by diluting said solution ten times, taking e.g. 10 ml of the diluted solution, adding 20 ml of potassium iodide (KI) 50% w/w and 75 ml of a sulphuric acid solution (0.1 N). The titration is carried out with sodium thiosulphate solution (0.1 N) while adding 1 wt % cooked corn starch solution as indicator which will change colour from purple to colorless. The amount of Na thiosulphate used to obtain a colorless solution is utilized to calculate the active chlorine (in %): % (w/v) chlorine=ml Na thiosulphate (0.1 N)×0.355. The % value can easily be reciprocated in ppm values according to standard transformation.

Protein content: was determined in accordance with the well-known Kjeldahl method (Rund, R. C. "*Fertilizers: Nitrogen (Total) in Fertilizers, Kjeldahl Method*", OFFICIAL METHODS OF ANALYSIS OF THE ASSOCIATION OF OFFICIAL ANALYTICAL CHEMISTS, edited by Kenneth Helrich, fifteen Edition, Airlington, Va. 1990, pg. 17). The method requires digestion or oxidation of nitrogen-bearing material in concentrated sulphuric acid containing potassium sulfate and copper selenite. The clear digestion is made alkaline with sodium hydroxide and the ammonia is distilled into standardized H2SO4. The amount of ammonia collected is quantitatively determined by back titration with a standard base. Protein is calculated from the nitrogen content by N×6.25 for corn.

Moisture content ("MC"): The moisture content was determined by weighing a sample placed in a pre-dried anhydrous recipient and subsequently heating the vessel containing the sample overnight (10 hours) in a ventilated oven at 105° C. An oven with circulating fans is preferred over a convection oven. The moisture content (in wt %) was calculated as $100 \times (W_1-W_2)/W_1$ where $W_1$ was the weight of the sample before drying in the oven and $W_2$ was the weight of the resulted dried sample. The weight was measured with a balance able to measure down to at least 0.01 grams. The same method can be applied to determine the dry solids content ($W_2$) of an aqueous sample.

pH: can be measured with any known pH metering device. It is preferred that the device is calibrated at the beginning of the measurements in accordance to the manufacturer's instructions. Cole-Parmer for example offers a range of pH meters able to measure pHs between −2 and 16 (see Oakton pH 700 range).

Viscosity measurements: The viscosity profile of a starch sample in a buffer solution of pH 3.0 was determined using a Brabender Viscograph®-E device. The pH was adjusted using standard buffer solutions commonly used for starch viscosity measurements. The device was calibrated and adjusted according to the described procedure by Brabender. A refrigerated water bath, set at 15° C., was connected to the device in order to ensure for a correct application of the desired temperature profile. Titrisol® (Merck, Cat. Nr 109883) was used as buffer solution to ensure for a constant pH of 3.00±0.02. The starch was dispersed by hand in the buffer solution at a temperature of about 30° C., in a weight amount of 5.5%, under good agitation and by using a mixing spoon or a mixing rod. To determine the viscosity (in BU), the following parameters were used:

Cartridge: 350 cmg
Revolution speed: 75 rpm
Temperature profile: total time is 90 min
    starting temperature: 50° C.
    heating rate: 1.5° C./min
    heating up to 95° C.
    30 min holding time at 95° C.
    cooling rate: 1.5° C./min
    final temperature: 50° C.

The following viscosities were determined:
Peak viscosity (PV): Viscosity at the peak, if any
Top viscosity (TV): Viscosity measured at the moment when the temperature reaches 95° C.
Hot paste viscosity (HPV): Viscosity after 30 min at 95° C.
End viscosity (EV): Viscosity measured after cooling at the moment when the temperature reaches 50° C.
Top viscosity breakdown (TVB): TVB=TV−HPV.

The invention will be further described with the help of the following examples and comparative experiments, without being however limited thereto.

Examples 1-4

2 kg of native waxy maize starch (C*Gel 04201) are slurrified in 3 liters of tap water. The obtained starch slurry is reacted with 3 wt % n-octenyl succinic anhydride at 30° C. for about 2 hours at a pH 8.5.

To this nOSA treated slurry sodium hypochlorite is added in various amounts sufficient to provide 4100 ppm, 5000 ppm, 6250 ppm and 7500 ppm of active chlorine, respectively. Under steady stirring the reaction is allowed to proceed for about 1 hour. Afterwards, the pH is brought to about 6 and excess chlorine is neutralized with sodium bisulphite. Subsequently the slurry is washed 2 times with the double volume of water and the resulting filter cake is dried in a fluid bed dryer (Fa. Retsch) at 60° C. to 10-15% moisture alternatively the cake is allowed to dry at ambient temperature overnight on the bench.

Comparative Experiments 1-3

The EXAMPLES were repeated, however using amounts of hypochlorite sufficient to provide 1000, 2500 and 4000 ppm active chlorine, respectively.

Rheological Results

Brabender viscograms of the obtained starches were taken at a concentration of 26.4 g starch dry basis sufficient buffer solution (pH of 3.0) to provide a total amount of 480 g slurry (see FIGS. 1A and B). Contrary to untreated waxy maize starch or to starches treated 4000 ppm or less active chlorine, the starches prepared according to invention show no viscosity breakdown during the 30 minutes heating at 95° C. and pH of 3.0. The pastes can be stored overnight at ambient or refrigerator temperature without showing any gelling tendency. Viscosity results are presented in the Table.

TABLE

| EXAMPLE | Ppm chlorine | viscosity breakdown at pH 3.0 after 30 min heating at 95° C. | viscosity at 30 min, 95° C., pH 3 | viscosity at 60 min, 95° C., pH 3 |
|---|---|---|---|---|
| C. EX. 1 | 1000 | 227 | 809 | 582 |
| C. EX. 2 | 2500 | 27 | 557 | 530 |
| C. Ex. 3 | 4000 | 1 | 514 | 513 |
| EX. 1 | 4100 | −84 | 447 | 531 |
| EX. 2 | 5000 | −203 | 224 | 427 |
| EX. 3 | 6250 | −286 | 130 | 416 |
| EX. 4 | 7500 | −191 | 49 | 240 |

Example 5

The following recipe (ingredients in %) was used to prepare a stirred yoghurt: Skimmed Milk: 79.96%; Skimmed Milk powder: 0.48%; Cream (35% fat): 8.12%; Sugar: 9.5%; Inventive Starch: 1.9%; Culture: 0.04%.

All ingredients were dispersed in cold milk under agitation during 30 min to hydrate, preheated to 55° C. up to 75° C., homogenized at 150 bars (in two steps at 120 bars and subsequently at 30 bars), pasteurized at 95° C. for 5 min, and cooled to 43° C. Then fermentation was started by adding a culture, followed by cooling & smoothing and filling in sterilized pots.

Application Results

Yoghurt sample with the starch of EXAMPLE 2 provided best overall properties: good viscosity development due to nicely swollen granules under applied processing conditions. Superior creaminess and shine were obtained with no starchy, pasty texture and a clean organoleptic profile without masking flavor.

A yoghurt sample with the starch of COMPARATIVE EXPERIMENT 2, provided significant less creaminess and shine and a pasty, starchy mouthfeel.

Yoghurt sample with the starch of EXAMPLE 4, showed similar textural benefits in terms of creaminess and shine as yoghurt sample with the starch of EXAMPLE 2, but generated somewhat lower viscosity. Due to a much higher stabilization level, granules seem to swell less under applied processing conditions.

Example 6

The following recipe (ingredients in %) was used to prepare a stirred yoghurt: Skimmed Milk: up to 100%; Skimmed Milk powder: 1.8%; Cream (35% fat): 4.3%; Sugar: 8.5%; Inventive Starch: 1.8%; Culture: 0.02%.

All ingredients were dispersed in cold milk under agitation during 30 min to hydrate, preheated to 55° C. up to 75° C., homogenized at 150 bars (in two steps at 120 bars and subsequently at 30 bars), pasteurized at 95° C. for 5 min, and cooled to 43° C. Then fermentation was started by adding a culture, followed by cooling & smoothing and filling in sterilized pots.

Comparative Example 4

The stirred yoghurt of EXAMPLE 6 was made without the inventive starch and the following recipe: Skimmed Milk: up to 100%; Skimmed Milk powder: 1.8%; Cream (35% fat): 10%; Sugar: 8.5%; Culture: 0.02%.

Comparative Example 5

The following recipe (ingredients in %) was used to prepare a stirred yoghurt in the same way of EXAMPLE 6: Skimmed Milk: up to 100%; Skimmed Milk powder: 1.8%; Cream (35% fat): 4.3%; Sugar: 8.5%; Hydroxypropylated and phosphate cross bonded waxy Starch (C*PolarTex 06739): 1.8%; Culture: 0.02%.

Results

Figure 2:
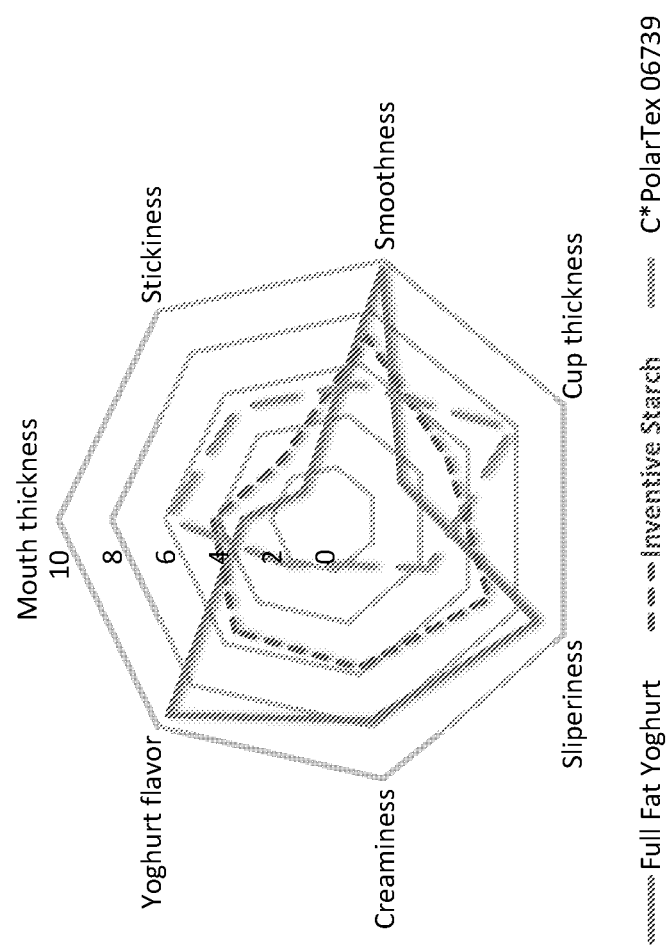
FIG. 2: Shows various attributes of stirred yoghurts made with the starch of the present invention and other starches commonly used in such applications.

A trained sensory panel was used to score the stirred yoghurts of EXAMPLE 6 and COMPARATIVE EXPERIMENTS 3 and 4 according to the following attributes: mouth thickness, stickiness, smoothness, cup thickness, slipperiness, creaminess and yoghurt flavor. The results are shown in a spider diagram of FIG. 2.

The yoghurt containing the inventive starch mimics the profile of a full fat yoghurt. Said starch delivers superior creaminess and shine allowing for fat reduction without impacting the taste and mouthfeel. The rheology of a yoghurt containing the inventive starch closes matches a full fat yoghurt without the starchy mouthfeel.

The invention claimed is:

1. A method for stabilizing starch, the method comprising:
modifying a base starch physically, chemically or enzymatically to obtain a modified starch, wherein the base starch has a protein content of less than 0.4% w/w; and
reacting said modified starch with a sufficient amount of reactant that forms active chlorine such that the reactant provides between 4100 ppm (w/v) and 8200 ppm (w/v) of active chlorine during the reacting of the modified starch with the reactant, to form a stabilized starch.

2. The method of claim 1, wherein the base starch has a protein content of between 0.10% and 0.38% w/w.

3. The method of claim 1, wherein the base starch comprises a waxy starch, a root starch, a tuber starch, and combinations thereof.

4. The method of claim 1, wherein the base starch is a waxy starch comprising waxy maize, waxy rice, waxy potato, waxy sorghum, waxy barley, or any combination thereof.

5. The method of claim 1, wherein modifying said starch physically, chemically or enzymatically comprises modifying said starch by a chemical reaction with a succinic anhydride.

6. The method of claim 1, wherein the reacting of the modified starch with the reactant is carried out at a pH of between 8.0 and 9.0, and wherein the modified starch is an n-octenyl succinic anhydride (nOSA) starch.

7. The method of claim 1, wherein the base starch has a protein content of between 0.25% and 0.30% w/w.

8. The method of claim 1, wherein the base starch has a protein content of 0.35% w/w or less.

9. The method of claim 1, wherein the reacting of said modified starch with the reactant that forms active chlorine is performed under alkaline conditions.

10. A method for stabilizing starch, the method comprising:
reacting a native starch that is root starch, tuber starch, and/or waxy starch, with a succinic anhydride to obtain a modified starch, wherein the native starch has a protein content of less than 0.4% w/w; and
reacting said modified starch with a sufficient amount of reactant that forms active chlorine such that the reactant provides between 4100 ppm (w/v) and 8200 ppm (w/v) of active chlorine during the reacting of the modified starch with the reactant, to form a stabilized starch.

11. The method of claim 10, wherein the modified starch is a modified waxy starch comprising modified waxy maize, modified waxy rice, modified waxy potato, modified waxy sorghum, modified waxy barley, or any combination thereof, and wherein the succinic anhydride is n-octenyl succinic anhydride.

12. The method of claim 10, wherein said amount of reactant is sufficient to provide at least 4500 ppm (w/v) active chlorine during the reacting of the modified starch with the reactant.

13. The method of claim 10, wherein the native starch is a native waxy starch.

14. The method of claim 10, wherein the reactant is selected from the group consisting of hypochlorite, peracetic acid, hydrogen peroxide in the presence of excess chloride ions, and combinations thereof.

15. The method of claim 13, wherein the method further comprises forming a food product comprising the stabilized starch, and wherein the food product containing the stabilized starch is selected from the group consisting of thickeners for soups and sauces, stabilizers for meat products, dressings, spreads, dairy products and convenience food.

16. The method of claim 13, wherein the method further comprises forming a food product comprising the stabilized starch, and wherein the food product containing the stabilized starch is selected from the group consisting of milk, butter, cheese, ice cream, pudding, sour cream, yogurt, and dried and condensed milk.

17. A method of stabilizing a starch, the method comprising:
reacting a native waxy starch with n-octenyl succinic anhydride (nOSA) to obtain a nOSA starch, wherein the native waxy starch has a protein content of less than 0.4% w/w; and
reacting the nOSA starch with sufficient sodium hypochlorite such that the sodium hypochlorite provides between 4500 ppm (w/v) and 8200 ppm (w/v) of active chlorine during the reacting of the nOSA starch with the sodium hypochlorite, to form a stabilized starch.

18. The method of claim 17, wherein the waxy starch is waxy maize starch.

19. The method of claim 17, wherein reacting the nOSA starch with sodium hypochlorite comprises reacting the nOSA starch with an amount of sodium hypochlorite sufficient to provide at least 5000 ppm (w/v) of active chlorine during the reacting of the nOSA starch with the sodium hypochlorite.

20. The method of claim 17, wherein the method further comprises forming a dairy food product comprising the stabilized starch, and wherein the dairy food product containing the stabilized starch is selected from the group consisting of milk, butter, cheese, ice cream, pudding, sour cream, yogurt, and dried and condensed milk.

* * * * *

UNITED STATES PATENT AND TRADEMARK OFFICE
CERTIFICATE OF CORRECTION

| | | |
|---|---|---|
| PATENT NO. | : 11,767,373 B2 | Page 1 of 1 |
| APPLICATION NO. | : 15/779223 | |
| DATED | : September 26, 2023 | |
| INVENTOR(S) | : Dirk Fonteyn | |

It is certified that error appears in the above-identified patent and that said Letters Patent is hereby corrected as shown below:

In the Claims

In Column 16, Line 43, in Claim 15, delete "13," and insert -- 10, --, therefor.

In Column 16, Line 49, in Claim 16, delete "13," and insert -- 10, --, therefor.

Signed and Sealed this
Thirtieth Day of January, 2024

Katherine Kelly Vidal
*Director of the United States Patent and Trademark Office*